C. A. PRESSEY.
AMUSEMENT APPARATUS.
APPLICATION FILED JULY 1, 1908.

930,613.

Patented Aug. 10, 1909.

WITNESSES:

INVENTOR
Charles A. Pressey,
BY
ATTORNEY

UNITED STATES PATENT OFFICE.

CHARLES A. PRESSEY, OF DALLAS, TEXAS, ASSIGNOR OF ONE-HALF TO MANLEY B. PRESSEY, OF DALLAS, TEXAS.

AMUSEMENT APPARATUS.

No. 930,613.      Specification of Letters Patent.      Patented Aug. 10, 1909.

Application filed July 1, 1908. Serial No. 441,314.

*To all whom it may concern:*

Be it known that I, CHARLES A. PRESSEY, citizen of the United States, residing at Dallas, in the county of Dallas and State of Texas, have invented certain new and useful Improvements in Amusement Apparatus, of which the following is a specification.

My invention relates to new and useful improvements in amusement apparatuses and more particularly to a fishing game.

The object of the invention is to provide a suitable tank or receptacle in the form of a canal filled with liquid to the proper height and means for agitating or moving the liquid so as to cause it to continually move as a current together with images adapted to float in or upon the liquid arranged to be caught with a hook and bearing prize symbols or identification marks.

Finally the object of the invention is to provide an apparatus of the character described that will be strong durable, efficient and simple and comparatively inexpensive to construct, also one in which the several parts will not be liable to get out of working order.

Figure 1:
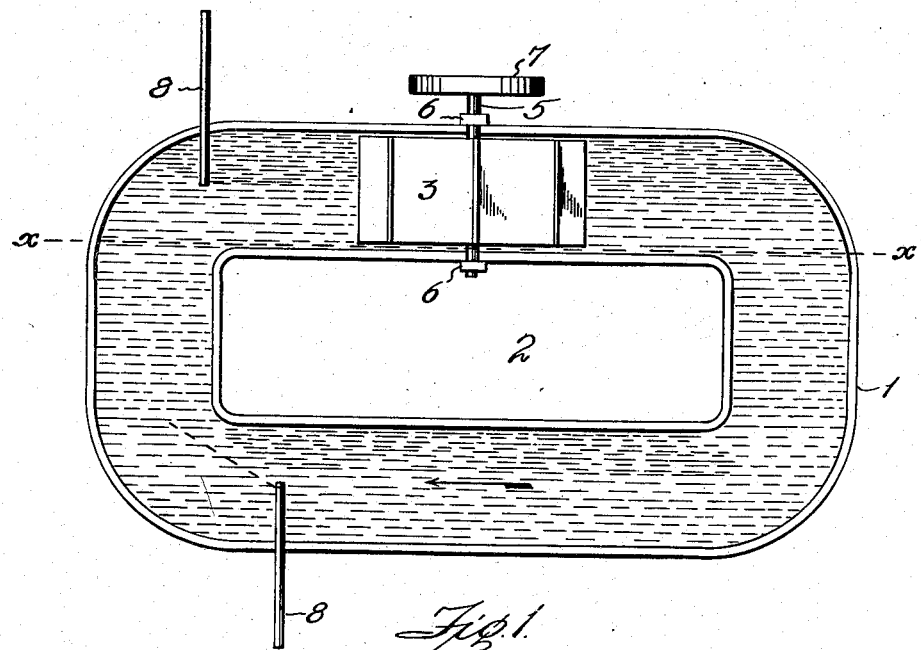
Figure 2:
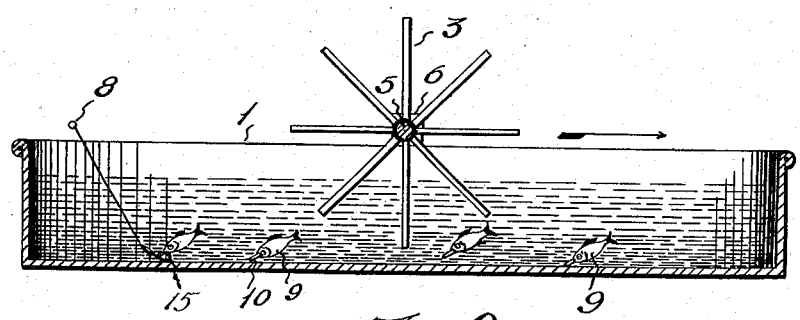
Figure 3:
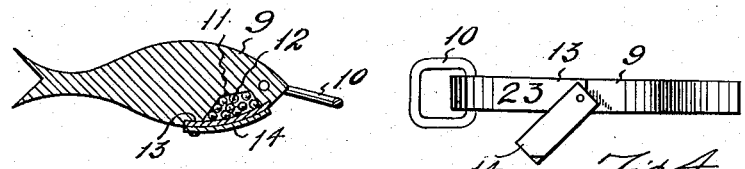
Figure 4:
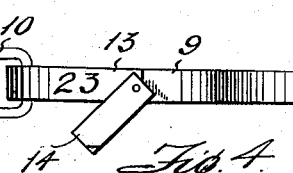

With the above and other objects in view, my invention has particular relation to certain novel features of construction and operation, an example of which is illustrated in the following specification and illustrated in the accompanying drawings, wherein:

Figure 1 is a plan view, of the apparatus, Fig. 2 is a longitudinal sectional view taken on the line $x$—$x$ of Fig. 1, Fig. 3 is a longitudinal sectional view of one of the images, and Fig. 4 is an underside view of one of the images.

In the drawings, the numeral 1 designates the tank which is arranged in the form of a continuous canal. It is to be understood that this tank may be of any convenient size, shape, form or material, that shown in the drawing being of a general rectangular form having a central opening or space 2.

The bottom of the tank is preferably substantially level. The tank is filled to a desirable height with a suitable liquid which may be transparent, semi-transparent or non-transparent or opaque. It is preferable to render the liquid non-transparent either by artificial means or by employing an opaque liquid, as submerged bodies floating in the liquid will be concealed, thus producing a more pleasing and interesting game.

At some convenient point in the tank means for agitating the liquid to cause it to travel around the tank as a current is provided. Various devices may be employed and I have shown a paddle wheel 3 fixed on a shaft 5 extending transversely across one side of the tank and mounted in bearings 6 supported on the upper edges of the tank as is shown in Fig. 1. On its outer end, the shaft is provided with a power wheel 7 to which motion is suitably transmitted to revolve the paddle wheel, although the latter may be revolved by any suitable means. Only the lower portion of the paddle wheel enters the liquid, and the wheel is of such diameter as to cause its blades or paddles to pass some distance above the bottom of the tank so as to provide a passage therebetween, the sides of the paddle wheel revolving in close proximity to the sides of the tank.

In playing the game or using the apparatus, the player is provided with a pole and line which he holds over the tank as indicated at 8 in Figs. 1 and 2, the line being provided with a sinker and suitable hook. Aquatic or other images or bodies provided with hook engaging means are placed in the liquid, which being agitated causes the images to float or to be carried around the tank as will be obvious. Where the liquid is non-transparent, the operation of fishing reduces itself to a matter of chance or guessing upon the part of the fisher, as to where the images are submerged in the non-transparent liquid. However, as the images move through the tank, they will be caught and pulled out of the liquid by the fisher. Of course if the images floated upon the liquid or were submerged in a transparent liquid, the operation of fishing would become a matter of skill.

It is obvious that the bodies or images which float in the tank may be made to represent various land animals, insects, reptiles and other creatures, as well as aquatic animals, insects, reptiles and other creatures. Of course the most natural aquatic creature to be represented is a fish and therefore in Figs. 3 and 4 I have shown an image representing a fish, but I wish it clearly understood that the invention is not to be limited by this showing.

The image 9 in the form of a fish in Figs. 3 and 4, is provided at its head with a forwardly projecting ring or loop 10 which is adapted to be engaged by the hook. When it is desired to have the image or fish float submerged, it is provided with a suitable weight such as a recess 11 filled with shot or other metal 12 and confined by a plate 13. This weight being located at the head of the fish causes it to float at an angle with the ring 10 directed downward as shown in Fig. 2, which causes it to be more readily engaged by the hook of the fishing line.

It is apparent that this game of fishing can be made more interesting by providing different symbols or numbers on the fish and have each fish as it is caught award a certain number of points or a prize according to the number or symbol it bears. In Fig. 4, I have shown a number placed on the plate 13 and a cover plate 14 adapted to be swung over the plate 13 to conceal the number, thus if the fish were floating in transparent water, it would be impossible for the fisher to see the number. Various ways of placing the number on the image and concealing the same may be devised. In Fig. 2 it will be noted that the fish float backward with the ring 10 projected downward and passing comparatively close to the bottom of the tank so as to be caught by the hook 15 of the pole and line should it happen to lie in the path in which the fish floats.

What I claim, is;

1. In an amusement apparatus, a tank for containing liquid, means for agitating the liquid, and images adapted to be carried around by the current, and means for causing the images to move tail end first.

2. In an amusement apparatus, a tank for containing liquid, means for agitating the liquid, an object adapted to be moved about the tank by the current, hook engaging means on one end of the object, and means for causing the object to move with the hook-engaging means hindmost.

3. In an amusement apparatus, a tank for containing liquid, means for agitating the liquid, an object adapted to be moved about the tank by the current, hook-engaging means on one end of the object, and means for causing the object to move with the hook-engaging means hindmost and in a lower plane than the remainder of the object.

4. In an amusement apparatus, objects constructed of buoyant material, hook-engaging means on one end thereof, and means for causing the objects to float submerged and at an angle with the end which is provided with the hook-engaging means lowermost when the objects are placed within liquid.

5. In an amusement apparatus, objects constructed of buoyant material, hook-engaging means on one end thereof and weights in the same end causing the objects to float submerged and at an angle, with the end which is provided with the hook-engaging means lowermost when the objects are placed within liquid.

6. In an amusement apparatus, objects constructed of buoyant material, hook-engaging means provided on a portion of each object, and means carried by the objects adjacent the portions equipped with the hook-engaging means to submerge the objects when placed within a moving body of liquid and to cause said portions to move hindmost and in a lower plane.

7. In an amusement apparatus, a tank for containing liquid, means for agitating the liquid, objects constructed of buoyant material and adapted to be carried around the tank by the current, rings on one end of each object, weights in the same end sufficient to submerge the objects and to cause only the ends of the objects equipped with the rings to drag along the bottom of the tank and to trail behind the other portions of the objects.

8. In an amusement apparatus, a tank for containing liquid, means for agitating the liquid, objects constructed of buoyant material and adapted to be carried around the tank by the current, rings on one end of each object, weights in the same end sufficient to submerge the objects and to cause only the ends of the objects equipped with the rings to drag along the bottom of the tank and to trail behind the other portions of the objects, the objects being each provided with a mark of identification, and a cover plate conforming to the contour of the object concealing the said mark.

In testimony whereof I have signed my name to this specification in the presence of two subscribing witnesses.

CHARLES A. PRESSEY.

Witnesses:
E. V. HARDWAY,
LELAN LEWIS.